United States Patent [19]

Lazcano-Navarro et al.

[11] Patent Number: 4,585,476
[45] Date of Patent: Apr. 29, 1986

[54] METHOD FOR PRODUCING LIQUID STEEL FROM IRON ORE

[75] Inventors: Arturo Lazcano-Navarro; Antonio Villaseñor-Mejía; Miguel A. Alcántara; Jorge Fernández-Garcia, all of Saltillo, Mexico

[73] Assignee: Instituto Mexicano de Investigaciones Siderurgicas, Saltillo, Mexico

[21] Appl. No.: 642,101

[22] Filed: Aug. 20, 1984

[30] Foreign Application Priority Data

May 9, 1984 [MX] Mexico .................................. 201281

[51] Int. Cl.⁴ .............................................. C21C 5/38
[52] U.S. Cl. .................................. 75/59.17; 75/59.28; 75/38
[58] Field of Search ...................... 75/38, 59.28, 59.17

[56] References Cited

U.S. PATENT DOCUMENTS

| | | | |
|---|---|---|---|
| 2,243,110 | 5/1941 | Madaras | 266/186 |
| 4,007,034 | 2/1977 | Hartwig et al. | 75/46 |
| 4,008,074 | 2/1977 | Rossner et al. | 75/46 |
| 4,045,214 | 8/1977 | Wetzel et al. | 75/38 |
| 4,238,226 | 12/1980 | Sanzenbacher et al. | 75/38 |
| 4,412,858 | 11/1983 | Viramontes-Brown et al. | 75/38 |
| 4,457,777 | 7/1984 | MacGregor et al. | 75/46 |

FOREIGN PATENT DOCUMENTS 2078779 1/1982 United Kingdom ..................... 75/29

*Primary Examiner*—Melvyn J. Andrews
*Attorney, Agent, or Firm*—Laurence R. Brown

[57] ABSTRACT

Improved method for producing steel with the combination of a basic oxygen furnace and a sponge iron plant. The sponge iron produced with a high carbon content, is loaded into the basic oxygen furnace in which oxygen and any type of powder carbon are injected through the bottom. During the melting and refining process, enough reducing gases are produced to yield all the energy needed to reduce iron ore into sponge iron in a batch process following the basic oxygen furnace cycles or continuous cycles. The gas produced per ton of liquid metal in the basic oxygen furnace is enough to produce iron as sponge iron.

6 Claims, 1 Drawing Figure

METHOD FOR PRODUCING LIQUID STEEL FROM IRON ORE

BACKGROUND OF THE INVENTION

The present invention is related to a method for producing liquid steel from iron ore. More specifically to the improved method of sponge iron production in either batch or continuous reactors, combined along with the melting and refining of steel coming from said sponge iron. It has been broadly demonstrated that iron ore in lump or pellet form can be efficiently and economically converted into sponge iron in moving bed, batch, fluidized or kiln reactors.

It is usually desired to convert the sponge iron produced in such reduction processes to molten form. A number of methods have been proposed for this effect. They disclose continuous processes to obtain molten iron and use it to produce steel. The molten iron is obtained in a container for the fusion of sponge iron and the continuous carbon gasification.

These processes are subject to a number of disadvantages due to the continuous production and give as a product a molten iron that has to be refined subsequently. This refining can be achieved in a basic oxygen furnace.

Another disadvantage of these processes is that they can not use any type of carbon.

SUMMARY OF THE INVENTION

It is accordingly an object of the present invention to provide an improved process for converting iron ore into liquid steel.

Another object of the invention is to provide an efficient and effective method to combine iron ore gaseous reduction reactors with a basic oxygen furnace.

Many other advantages and features of the present invention will become manifest to those versed in the art amongst others that the basic oxygen furnace works in this combination as a sponge iron melter, gas generator and refiner to produce the steel as specificated. Likewise, it works in batch form while the iron ore reduction part could work in either batch or continuous form.

BRIEF DESCRIPTION OF THE DRAWINGS

FIG. #1 shows a schematic view of the parts, sections and flows used in the method.

DESCRIPTION OF THE INVENTION

Figure 1:
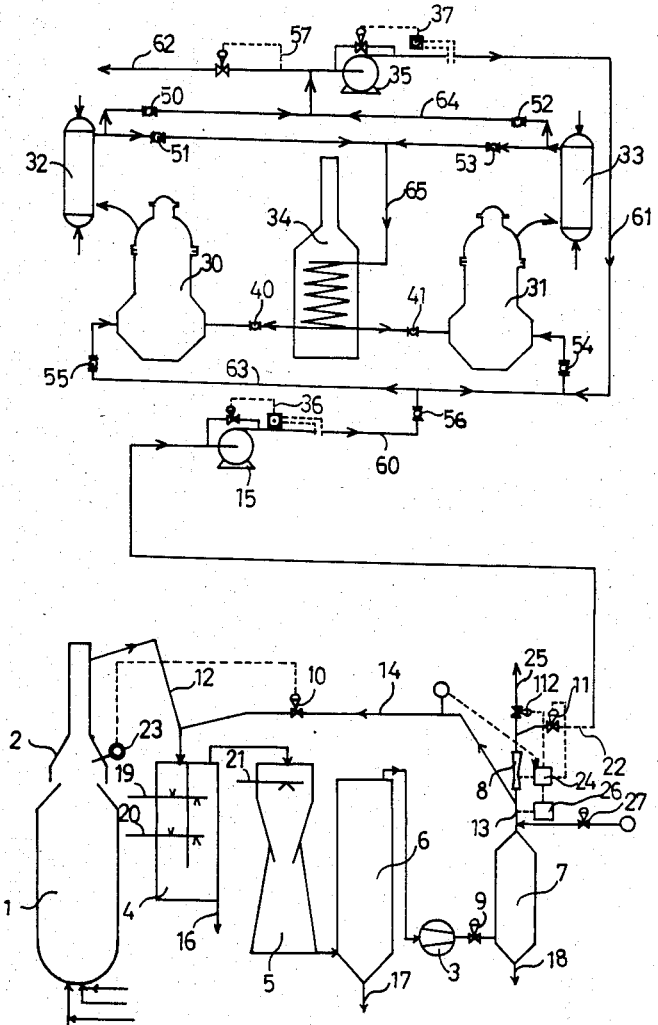

The method consists of loading a converter with sponge iron having a certain percentage of carbon, specially high, or with mixtures of sponge iron, liquid metal, melted iron and/or scrap.

Carbon and oxygen are injected first through the bottom of the converter to melt sponge iron.

The finely divided carbon, is pneumatically loaded using nitrogen or hydrocarbons such as methane or propane as a transport gas. The cooling of the injection nozzles is achieved by nitrogen or hydrocarbons.

Finely divided fluxes are injected through the bottom of the converter when the liquid is formed, according to the neutrality of the slag and the required amount of steel. The top of the converter is sealed to avoid contamination of the gas generated in the converter with atmospheric air. The amount of gas generated per ton of liquid steel depends on the relationship of the liquid to solid loads in the converter, carbon composition and percent of metallization of the sponge iron. This volume of gases goes from 30,000 to 71,000 cubic feet (850 to 2,000 C. M.) per ton of liquid steel produced according to the relationship of load in the converter and carbon analysis. The gas generated is mainly a mixture of carbon monoxide and hydrogen, the sum of which is from 75 to 95 percent. Also, this gas has to be conditioned for the use in reduction of iron ore since it has from 100 to 220 ppm of dust and its temperature is about 3100° F. (1700° C.)

The joint between the converter and the direct reduction system is achieved according to the following description: Referring to the drawing, the numeral (1) represents a converter with injection through the bottom of carbon, oxygen, fluxes and cooling gases. The top of the converter is sealed with a device, retractable bell (2). This device avoids the atmospheric air entrance, but is retired at the end of the refining cycle, to allow reheating of the liquid metal and reloading of the converter. When a new cycle is started the system is purged with nitrogen through a valve (27).

The hot gas (12) enters a cooling and washing system (4), (5) and (6), where cooling water is passed through entries (19), (20) and (21), and the dust is picked up in outles (16) and (17). The fan (3) impells the gas outside of the system generating a pressure a little lower than atmospheric in retractile bell (2). This vacuum must be controlled perfectly otherwise a big amount of air could enter the top of the converter (1).

Control is executed of a recycling stream (14) by the valve (10) together with the pressure control (23). The stream (14) also acts as a temper stream. The moisture separator (7) allows the moisture to leave through exit (18). The gas leaves to the stack (25) via the valve (12), and through the valve (11) is possible to store such gas in a gas holder to use it in the iron ore reduction or to send the reducing gas directly to a reduction system through the compressor (15).

The stream (22) must not take oxygen to the direct reduction system. The oxygen could enter through the stack (25) if the gas needed in the compressor (15) is more than that allowed by the measurement system (8). To avoid this hazardous situation, the gas measurement (8) is checked in the controller (24) and along with the pressure of the stream (14) establishes an equilibrium of the streams (25) and (22) in such a way that stream (25) always flows, for example, with 15 percent of the gas measured in the measurement system (8) as minimum without altering the recycle system (14).

The valve (9) controls the capacity of fan (3). The set control point of valve (9) is imposed according to the initial load to the converter and to the bottom injection thus depending on the volume of generated gases. If it is not so and if the fan capacity (3) is controlled through for instance, variable means, it will use its maximum capacity immediately since it would need to open the valve (10) completely increasing the stream (14) and thus will unbalance the system. If atmospheric oxygen enters due to a failure, or the generated gas has low carbon monoxide, the gas is deflected to the stack (25) through the detector (26) and the controller (24), thus sending a signal to open the valve (112) and close the valve (11). The stream of reducing gas (22) is used directly to reduce iron ore. Said iron ore reduction is achieved in a batch form since the gas generation is in batch form. Said direct reduction system comprises basically two batch reactors (30,31) alternating in cooling and reduction cycles which last as long as the heat lasts. The control circuit (36) controls the flow of gas (22) from the converter (1) that is desired in the reduction system. Control circuit (36) acts jointly with the control (24) since the compressor (15) cannot handle more gas than that generated in the converter (1). The gas stream (60) is joined with the recycling stream (61) coming from the recycling compressor (35) controlled by the control circuit (37) making the stream (63) which enters via the valves (54) or (55), depending on which of the reactors (30) or (31) is in the cooling cycle. The gas entrance to the reactors (30, 31) is at the bottom through special tuyeres letting the flow ascend in said reactors. The cooling gas goes to the coolers (32) or (33) and leaving these goes to the gas heater (34) via the valves (51) or (53).

The stream (65) to the gas heater (34) increases its temperature in said gas heater (34) in the range of 1470 to 1950 F. (800 to 1050 C.) and goes to the reactor in the reduction cycle via the hot valves (40) or (41). This hot reducing gas enters at the bottom of said reactor and is distributed in the same tuyeres for entrance of cooling gas. The flow of hot reducing gas also ascends. The gas product of the reduction passes to the gas coolers (32) or (33), after, via then through the valves (50) or (52) to the compressor (35) where the gas stream (61) is recycled. Another part of the tail gas is purged being this the stream (62) which is used as fuel. The control circuit (57) is used to give the required counter pressure to the system. The duration of the cooling and reduction cycles is the same as the converter cycle. During this time, one of said reactors is in cooling cycle and the other is in reduction cycle when the heating and loading cycle of the converter (1) is done. When the reactor ends the cooling cycle it is purged, the sponge iron is unloaded and iron is loaded. The reactor that ended the reduction cycle starts the cooling cycle while the other is, unloading, and loading. The cooling gas during this time is nitrogen, natural gas or carbon dioxide. Natural gas is preferred for its high capacity as a heat absorber. The amount of gas used in this period is low since the gas acts only as cooler, removing heat from the reactor, and transferring it to the water in the gas cooler and recycling through the recycling compressor (35). In this way, a closed-circuit is established.

The gas entrances to the reactors are in the bottom due to the high volume of gas that has to pass to heat the iron ore and reduce it during the same time gas is generated in the converter (1). With descending flow in the reactor particles would be entrained in the gas plenum, which would be in the bottom.

If the composition of generated gas in said converter is not the best for a specified type of iron ore, this may change the bottom injection in the converter. For instance, if more hydrogen is wished, more cooling gas is injected, such as hydrocarbon, and the extra injected carbon is taked away from the powder injected at the same converter.

This simple balance is achieved by analyzers or gas measuring systems.

The reducing gas stream could be heated by a plasma heater before entering the reduction reactor.

What is claimed is:

1. A method for producing liquid steel from iron ore which comprises supplying said ore in lump or pellet form to two batch reactors, working the reactors in alternate reduction and cooling cycles, passing into the batch reactors an ascendant cool stream of reducing gas in the cooling cycle and an ascendant hot stream of reducing gas in the reducing cycle, recycling a part of the gas product of the reduction and adding fresh reducing gas for use as a cooling gas in the cooling cycle and as a reducing gas for the reducing cycle, generating said fresh reducing gas in a converter that works in a batch form and is loaded with sponge iron product of said reduction of iron ore and then is injected with carbon, oxygen, fluxes and cooling gas through the bottom to achieve the melting and refining of sponge iron and the generation of reducing gases, sealing said converter with a retractable bell during heating and retiring it to load the converter, and after completion of the batch when reducing gas is not generated, unloading sponge iron from the iron ore reduction batch reactor when the cooling cycle is over, loading said reactor again with iron ore, feeding the obtained sponge iron to the converter, and starting new melting and refining cycles in the converter and new cooling and reduction cycles in the iron ore reduction reactors.

2. A method for producing liquid steel from iron ore according to claim 1 in which a part of the effluent of reducing gas generated in the converter is recycled after washing the gases obtained from the converter and using a portion of the washed gases as a temper stream and as a pressure control medium for the retractable bell seal of the converter.

3. A method for producing liquid steel from iron ore according to claim 1 including the step of loading the converter with materials including, molten iron, scrap, or sponge iron.

4. A method for producing liquid steel from iron ore according to claim 1 in which a cooling stream formed by a gas is recycled in the reactor at the end of its reduction cycle when the converter batch is finished.

5. A method for producing liquid steel from iron ore according to claim 1 in which the reducing gas stream is heated before entering the reduction reactor.

6. A method for producing liquid steel from iron ore according to claim 1 in which the converter is sealed by a retractable bell which is retired to reload the converter when reducing gas is no longer generated, and using reducing gas from another source while melting and refining steel in the converter.

* * * * *